FIG. I

United States Patent Office 3,674,561
Patented July 4, 1972

3,674,561
PROCESS FOR PRODUCING ELECTRODES FOR RECHARGEABLE ALKALINE CELLS
Takashi Tsuchida, Yoshiaki Hayase, and Yoshirou Fujisawa, Shizuoka-ken, Japan, assignors to Fuji Denki Kagaku Kabushiki Kaisha, Tokyo, Japan
Filed July 17, 1970, Ser. No. 55,631
Claims priority, application Japan, July 30, 1969, 44/59,652
Int. Cl. H01m 43/04
U.S. Cl. 136—29  14 Claims

ABSTRACT OF THE DISCLOSURE

Electrodes for rechargeable alkaline cells and a process for producing same are provided. The electrode comprises a substratum, metallic nickel dendrite electrolytically cohered on said substratum, and nickel oxy-hydroxide exposed on said nickel dendrite. The process comprises the steps of preparing an electro-bath containing $NO_3$ ion in the range of about 0.16% to about 3.52%, $SO_4$ ion in the range of about 1.4% to about 18.1%, and Cl ion in the range of about 2.2% to about 11.5%, keeping said electro-bath weakly acidic, keeping the temperature of said electro-bath over 40° C., electrolytically cohering nickel dendrite layers to a substratum, and immediately electrolytically oxidizing said layers in an alkaline aqueous solution.

---

This invention relates to an electrode for rechargeable alkaline cells and a process for producing same wherein cohered dendrite layers are utilized for the electrode and nickel oxyhydroxide (NiOOH) is used as the active material.

Heretofore, a process for making a positive plate to be employed in an alkaline accumulator, which battery typically is a rechargeable alkaline cell, has been performed by the steps of applying a large pressure on an active material, composed of a mixture of nickel hydroxide $Ni(OH)_2$ with graphite or nickel leaf, into the form of a perforated metallic tube or pocket, fitting the above product to a frame to make a plate, and subjecting the plate to transformation which repeatedly charges and discharges it. But various problems remained in this process.

Another process for making positive plates included the steps of soaking porous plaques, which are produced by sintering metallic nickel, in the form of unpressed powder, made by carbonyl or electrolysis system around a wire-netting at a temperature of about 900° C., into solutions of nickel salts such as nickel nitrate, cathodically polarizing the soaked plates in an alkaline solution, depositing nickel hydroxide $(Ni(OH)_2)$ into pores of the plaques forming the plates, washing the plates and drying them. The repeated cycles of this process, in order to deposit the desired amount of active materials into the pores of the plaques, has made it costly. As an improvement thereof, there was provided a process which included the steps of soaking sintered plaques into fused nickel nitrates and subjecting said sintered plaques to heat resolution in a steam atmosphere. This process also has a weak point in that the sintered plaque is easily corroded and weakened.

Further, another process has been suggested which comprises the steps of cathodically polarizing sintered plaques in an aqueous solution of nickel nitrates, interrupting an electric current, and depositing nickel hydroxide in the pores of the porous plaques. But, although it is desirable to deposit the nickel hydroxide in a short time, this process is slow because it relies upon depositing on the surface of the porous plaques.

In addition, in order to prevent the electrolyte from degenerating, a process has been suggested which electrolytically deposits nickel hydroxide from sulfate, chloride and nitrate solutions in which cobalt is added (more than 0.3% to nickel). Plates made in accordance with this process, however, have a weak point in that the active mass falls off from the plate when recharging.

Recently, "The Electrolytic Sintering of Nickel Powder" has been reported in Canada. The report states as follows: "Adherent and coherent deposits of nickel sponge similar to sintered nickel may be made from sulphate, chloride, fluoborate or sulphamate nickel plating solutions containing nickel powder in suspension, providing the concentration of free acid is maintained sufficiently high to inhibit codeposition of $Ni(OH)_2$. In nitrate solution, cathodic reduction of nitrate and deposition of $Ni(OH)_2$ predominates." Comparing to this reported process, the process according to the present invention is a new and excellent one in that it is unnecessary to provide steps to suspend the nickel powder and to reduce the sponge to cathodic in the particular nitrate solution.

When making a cell of large capacity with less internal resistance, it is efficient and appropriate to improve electro-conductivity and diffusion in such a manner as to widen the action area of plates, to thin the thickness of active mass, to adhere active material to an electric conductor, to uniformly narrow the distance between the positive and negative plates so that the electrochemical reaction may be progressed smoothly and so that gases frequently grown in the boundary between the electrolyte and the active material may easily be radiated, and to prepare a wide electrolyte layer.

For these reasons, sintered type nickel cadmium rechargeable batteries adopting the sintered plaques employ thin sintered plates of about 0.7 mm. thick. But it is very difficult to make such plates increasingly thinner.

After repeating many experiments in order to overcome the above-mentioned problems, the inventors have completed the present invention on the basis of the facts they found, that a very minor accumulate phenomenon is seen when a metallic nickel foil is electrically oxidized in alkaline electrolyte, that dendrite in any shape is grown when the operation is performed with high-current-density and that flat metallic crystal is not grown when nitrate is added to plating solutions; whereby the layer obtained by this plating is brightless and black.

Namely, the nickel dendrite is cohered to metallic substratums for that the electrode of the battery cells as strong as possible. The nickel dendrite in such a state is deposited into the alkaline electrolyte, thereby electrolytically oxidizing the nickel dendrite. A rechargeable battery using an active, inexpensive positive electrode is thereby produced in such manner, according to the present invention.

Different from the old process in which nickel hydroxide is directly electrodeposited to the sintered plaque, the present invention relates to the process in which the nickel dendrite is powerfully deposited to the metallic substratum in a coherent state. The deposited dendrite is determined to be almost metallic nickel from a pattern of X-ray diffractionmetry. Since the surface of the dendrite is very active, when the electro-current is interrupted in the midst of plating and again plated, the dendrite will always come off (fall off) easily from the face at the time of the interruption of the current, losing the electro-capacity quickly. After the dendrite plating, the longer is the washing time the more the quantity of the dendrite is changed to nickel-hydroxide at the surface thereof. Further, when using a positive plate in which nickel-hydroxide is considerably grown (by high quantity rate of nickel nitrate in the composition of plating solution), the electro-capacity of the positive plate is decreased as the active mass drops when recharged.

As the positive plate according to the present invention is unusually active, the transformation process, in which the positive oxidation and the negative reduction are repeated for several cycles and which has been required for positive plates produced in the conventional process using nickel hydroxide, can be abridged. Namely, almost the desired capacity is afforded to the plate of the present invention by positive oxidation only one time in the alkaline electrolyte. Because the dendrite produced in accordance with the process of the present invention is extremely powerfully cohered in a suitable shape for electrochemical reaction, the active mass does not come off and the drop thereof is only a petty amount. Therefore, batteries utilizing such dendrite layers are fit to be recharged for a long time.

As adaptable and acceptable substratums, it is desirable to use perforated nickel foil, nickel plated iron foil, metallic nickel net and/or the like. Tiny holes perforated through the foil are useful especially in hermetic sealed cells with limited electrolyte to prevent only one side of the active mass cohered on both sides of the substratum from being utilized. However, in cells containing as much electrolyte as possible, the substratum for the electrode can be an unperforated metallic foil.

According to the present process for producing the electrodes, various shapes of deposited layers are obtained from the dendrite which has already been cohered and deposited on the surface of the substratum by varying the conditions (i.e., composition of electro-bath, concentration, temperature of solution, pH, and electric current density or the like). The shape of the deposited layers is also influenced by the degree of agitation of the solution.

Before depositing the dendrite to the foil shaped substratum to be electrolytically cohered, the substratum has to be degreased, washed and/or abrased, or polished like the fore-treatment that is usual with nickel platings. In such a case when the surface of the nickel foil is to be used for the substratum, the surface of the nickel foil is corroded by an acid of suitable concentration (i.e. $H_2SO_4$, $HNO_3$ or $HCl$) to lay a new metallic nickel face bare and then the plating of the dendrite on the substratum must start speedily before the chemical change of the surface may arise. The main compositions of the plating solution to produce an electrode in which less dendrite comes off (falls off) are shown in the following table with their desirable ranges. FIG. 1 also shows these ranges in diagram.

| Compound: | Range of composition, percent |
|---|---|
| $NiSO_4 \cdot 6H_2O$ | 90–25 |
| $NiCl_2 \cdot 6H_2O$ | 70–5 |
| $Ni(NO_3)_2 \cdot 6H_2O$ | 15–2.5 |

Thus, the chemical formulas are shown to contain water of crystallization as part of their compositions because they are easily soluble in water when preparing the plating solution and because these materials are easily available. Accordingly, the ratios of compositions are easily available. Accordingly, the ratios of the compositions $NO_3$, $Cl$, and $SO_4$ are calculated from their molecular weights.

Among these three compositions, in such a case when the proportion of $NO_3$ is extremely decreased, a foil shaped plating layer having a metallic gloss of developed crystallization is produced. As the plating layer develops during the progress of the plating, the plating layer strains and warps, so that no flat layers are produced and some layers come off. The electrical capacity of the cell adapting the layer thus produced is very little.

When the proportion of $NO_3$ is increased to an excess, nickel hydroxide $Ni(OH)_2$ is abundantly grown, obstructing the crystallization of the dendrite, so that the layer having a desirable intension cannot be produced. In the electrode cells with such layer, the dendrite and active material will come off and drop early while in recharge. The nickel hydroxide produced along with the dendrite from the plating solution containing $NO_3$ is, as hereinafter described, in the form of un-uniformly strained crystals. The nickel hydroxide is considered to be produced by chemical change in aqueous solution since the metallic nickel dendrite is greatly active.

In such a case when the proportion of $Cl$ is decreased and when the proportion of $SO_4$ is in excess, gases partially and collectively generated while plating, so that some parts are not electro-deposited and no flat layers are produced. These layers easily fall off when recharged. Moreover, in such proportions the nickel on the positive electrode is difficult to dissolve and the concentration of the nickel in the plating solution is gradually decreased, so that electrolytically deposited homogeneous layers cannot be obtained.

In such a case when the proportion of $SO_4$ is decreased and when the proportion of $Cl$ is in excess, the electrolytically deposited layers are partly grown, which layers also come off (fall off) from the substratum when recharged.

Consequently, when the salt proportions out of the ranges of the above-described table are applied, it is undesirable since an inactive electrolytically deposited layer is grown or, alternatively, the deposited layers come off (fall off) from the flat surface of the substratum.

The addition of sodium (NA) and potassium (K) as additives or impurities to said salts of $SO_4$, $Cl$, and $NO_3$ is undesirable, because green nickel hydroxide deposits in proportion to the quantity of Na and K and hence weakens the coherence of the layers to the substratum and because the nickel hydroxide in the electro-bath starts to drift as the quantity of Na or K increases.

A small quantity of $NH_3$, Mn, Fe, Co, Cu, Mo, Cd, In, Hg, Pd, Pt and/or the like can be contained in the plating solution without difficulty. But each of them has bounds on the amount in the solution. In the electro-bath containing the material exceeding each bound, the coherence strength of the electrolytically deposited layers is weakened. Even if a very small quantity of Mg, Al, Ca, As, Sr, Ba, Ag, Sn, Pb, Fe and/or the like is contained in the electro-bath in a precipitate, sediment or floating condition, the coherence strength of the deposited layer is weakened. Especially, as the existence of Ca causes extreme damage to the Cd used in negative electrode of the alkaline accumulator, the intermixing of Ca should be avoided.

The other boric acids usually added for nickel plating have the effect of making the deposited layers more uniform, but the excessive solution of the boric acids results in production of metallic plate-like layers which comes off easily from the substratum while the battery is being recharged.

When a metallic porous plaque produced in accordance with the sintered process is adapted instead of the metal foil or the net-like substratum, the pores of the porous plaque are suitable for settling and maintaining the nickel hydroxide. Therefore, the metallic porous plaque is practically adaptable for deposited layers having low coherence strength, with the result that one does not need only to grow the dendrite.

The best solvent of this plating solution is water. The above-mentioned three salts are dissolved in water to produce a plating solution in which the total concentration of the said three salts is in the range of from about 15% to about 55%, namely in the range of from about 10% to about 35%, if converted to the anhydride salts.

When the total concentration of the salts is lower than the above-stated range, the coherent state of the dendrite is wrong. The electrode produced in such a concentration may have little electric capacity. On the other hand, when the total concentration of the salts is in excess, the density of produced dendrite will be excessively high and the layers of dendrite will become cracked by change of temperature or moisture, whereby the layers of dendrite come off (fall off) from the substratum due to their strain as soon as they are taken out from the plating solution or while in recharge.

The control of the total concentration of the salts is accomplished by adjusting the temperature of the plating solution and by measuring, adjusting and correcting the density, namely, the specific gravity, of the plating solution thus prepared contains $NO_3$ ion in the range of about 0.16% to about 3.52%, $SO_4$ ion in the range of about 1.4% to about 18.1%, and Cl ion in the range of about 2.2% to 11.5%. The ranges of these ions are calculated from the ranges of the salts shown in FIG. 1. The desirable temperature of the plating solution is higher than about 40° C. and the most desirable temperature is about 90° C. The deposited layers produced from the solution at the temperature higher than 30° C. but lower than 40° C. are low in electric capacity and weak in cohesion to the substratum, so that the layers will partly come off (fall off) after a few cycles of recharging.

Hydrogen-ion concentration (pH) in the plating solution is an important factor. The preferable range of pH is from about 2 to 6.2, but the most preferable range of pH to produce the desirable dendrite layers is to be lower than 5. To keep pH weakly acidic, it is useful in order to prevent hydroxide from being produced, to make it difficult for the chemical change of the active surface of the formed dendrite to nickel hydroxide, and to successfully produce the dendrite.

As $HNO_3$ is reduced and transformed to $NH_3$ by side reaction in electrolysis, $HNO_3$ corresponding to the used quantity has to be supplied. This supply must be an especially accurate quantity. Simultaneously, it is required to control the pH by supplying the mixed weak acid and water correspondingly to the quantity lost due to scooping from the plating solution, which loss contains HCl, $H_2SO_4$ and water, and to the loss due to vaporization. If thus controlled, the plating solution can be continuously used during more than 500 a.h./l. Further, if the produced ammonium is removed or used by oxidizing, the plating solution can be used almost permanently without exchanging it.

The electric current density to produce the dendrite layers, according to the present invention, is higher than that of the conventional nickel plating. The optimum value of the electric current density is varied in accordance with temperature of the plating solution and, therefore, exists in a wide domain such as from about 5 a./dm.$^2$ to about 45 a./dm.$^2$. The closer the electric current wave is to a flat, the less the electrolytically deposited layers come off (fall off). An application of a half-wave rectifying current or a wave current putting A.C. upon D.C. is undesirable. Such currents are undesirable because the electro-deposited layers thereby produced come off easily since the growth of the dendrite is obstructed like the current interruption and since a large quantity of $Ni(OH)_2$ is grown. At the starting time of the plating, if the substratum is in the plating solution and then the current is already flowing, the layers of cohered state, namely, the state difficult to come off (fall off) from the substratum, are produced. On the contrary, if the electric current starts to flow (the plating is started) after dipping the substratum in the plating solution, the layers come off easily from the boundary of the substratum in proportion to the time period elapsed from the dipping time to the time when the electric current starts to flow.

It is desirable for the anode in the plating process to use a metallic nickel similar to that used in the conventional nickel plating. In order to eliminate the influence of floating matter such as dissolution residue and the like, the use of an anode bag affords a desirable effect, similar to the adoption of continuous filter apparatus for filtering the plating solution.

Since a stirring condition of the plating solution has a great influence on the growth and the dissolution of the dendrite, it is desirable to keep the plating solution at the neighborhood of the cathode plate in as quiet a state as possible.

A thin long tape-shaped metal plate, a perforated thin metal plate or foil, a metal net or small meshes and the like are applicable as materials of the substratum. The electro-deposited layers are continuously produced by the steps of continuously inserting the coiled substratum made of the above-mentioned material from one side thereof into the electro-bath under charging voltage, successively depositing the dendrite electrolytically in a constant thickness, and immediately pulling out the plated substratum from the electro-bath. The electro-deposited quantity of the dendrite is adjustable by the length of the plating time in the electro-bath. When producing an electrode of the accumulator by cutting off the tape-shaped thin metal plate having the dendrite layers electro-deposited thereon, there arises a great strain in the vicinity of the cut-off portion and the dendrite easily comes off from the substratum upon repeated charge and discharge, as the dendrite layers become thicker and thicker. Therefore, in order to reduce the electro-deposition of the dendrite, at the pre-arranged cut-off portions, to a very little quantity, it is preferred to approach and set a suitably shaped insulative frame to the substratum during the plating process. In addition, to weld a conductive plate to the substratum of the electrode for connecting the electrode to the terminal, the electro-depositing at the pre-arranged connection portions can also be obstructed by setting the above-mentioned insulative frame to the selected portions of the substratum. Instead of the frame, a slender cohesive tape-like insulator may be applied or, alternatively, insulative paints can be previously spread or printed on the substratum.

A typical practicable example for producing a positive electrode of rechargeable alkaline cells according to the present invention is described as follows. Dendrite layers are electrolytically produced upon a substratum made of annealed nickel by the steps of dipping the substratum in dilute acid, corroding it so that the clear metal surface of nickel may be exposed, quickly washing it by passing through pure water, and inserting it into the plating solution, described hereinafter, while passing current through the solution. The plating solution is a composition consisting of 75% of $Ni(SO_4)_2.6H_2O$, 17.5% of $NiCl_2.6H_2O$, and 7.5% of $Ni(NO_3)_2.6H_2O$, the dissolving rate of the total salts by weight being 33%. The temperature of the plating solution is kept to 90° C. and the pH value is regulated to 4. A positive electrode for rechargeable alkaline cells can be made by the steps of electro-depositing dendrite continuously upon a substratum for 10 minutes at the plating current density of about 20 a./dm.$^2$ with respect to the apparent surface area of the substratum, drawing out the substratum immediately while continuously flowing current, washing down quickly any plating solution which clings to the layers in pure water, dipping the substratum in an aqueous solution of 37% of KOH, electrolytically oxidizing it for about 1 hour at the charging current density of about 15 ma./cm.$^2$, and cutting it off to a proper size.

FIG. 2 is a photograph, surveyed by Scanning Electron Microscope, of the surface of a positive electrode produced along the process according to the present invention. γ-Type NiOOH was adhered to the surface of the dendrite produced by the plating mentioned above in granular shape of about 1 micron. The surface area of this dendrite layer measured by B.E.T. apparatus was about 10 m.$^2$/g. The electro-capacity thereof, when used as the positive electrode of alkaline cell, was about 0.15 a.h./g. and the recharge durability was about 200 cycles.

FIG. 3a shows an X-ray deflection pattern of common electrolytic nickel powder grown by violently gasing at very high current density the electro-bath of pH 4 comprising aqueous solution of $NiSO_4$ added with $NH_4Cl$.

FIG. 3 shows the properties of the plating layers produced according to the process of the present invention;

Figure 1:
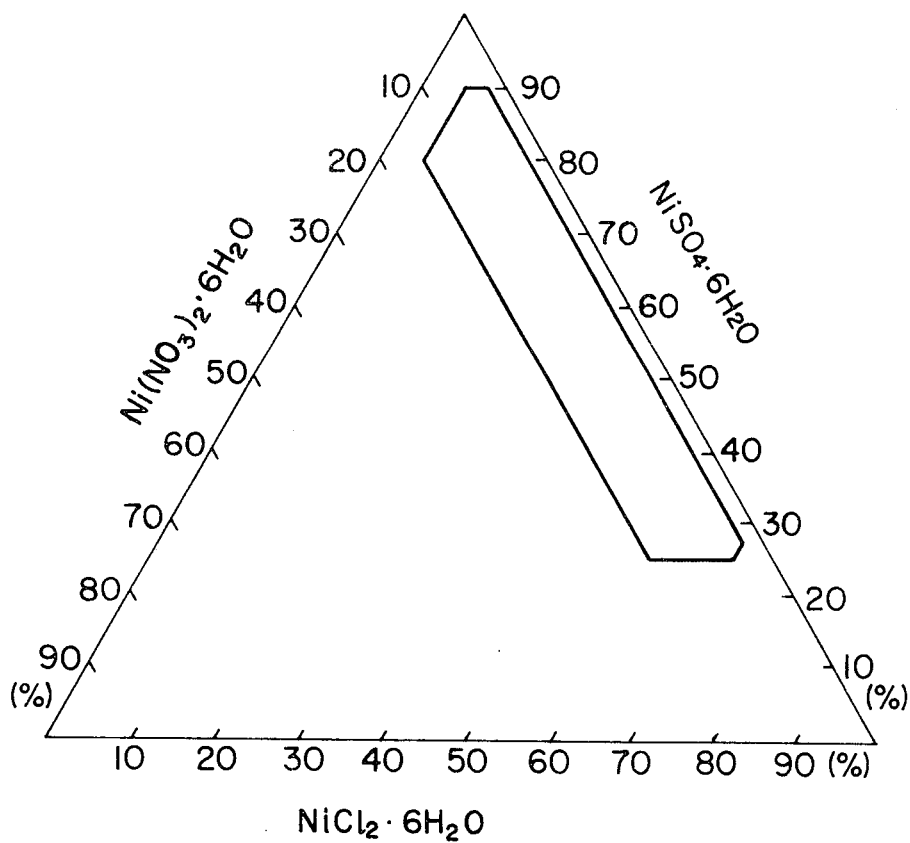
Figure 2:
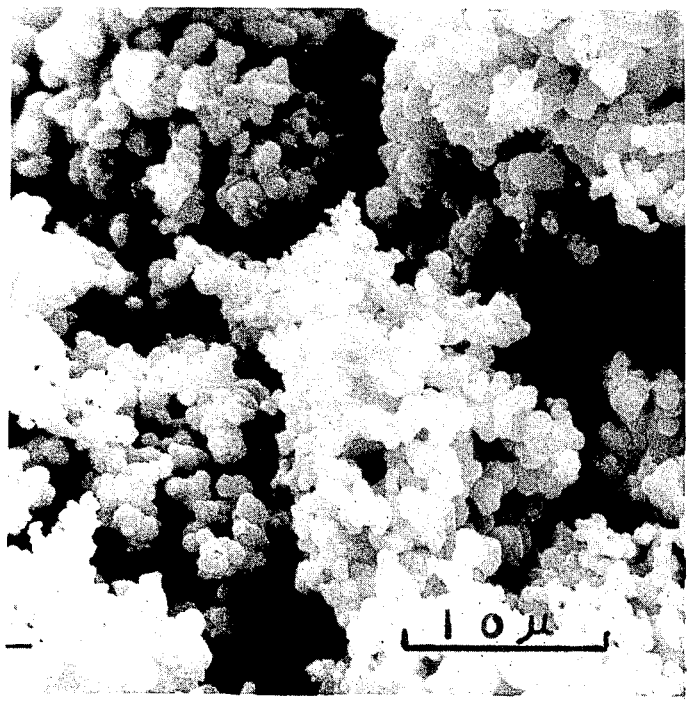
Figure 3A:
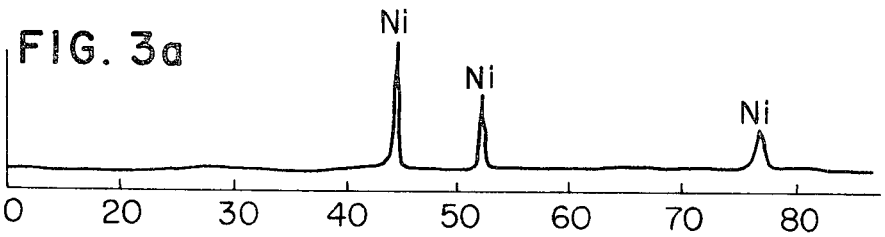
FIGS. 3a to 3f show X-ray deflection patterns to compare the powder scraped from the deposited layers on the substratum of said positive electrode according to the present invention to the electrolytic nickel powder produced by the well-known method.
Figure 3B:
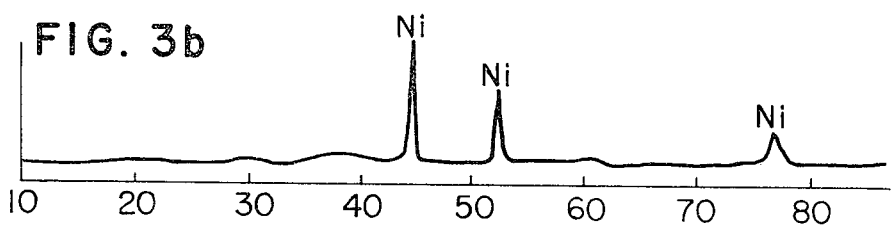

FIG. 3b shows an X-ray deflection pattern of powder scraped off from the substratum which is electrodeposited with dendrite layers of the present invention but not oxidized electolytically in alkaline electrolyte. The existence of $Ni(OH)_2$ is not precisely certified from this pattern. The deposited layers can be determined to be almost metallic nickel dendrite.

Figure 3C:
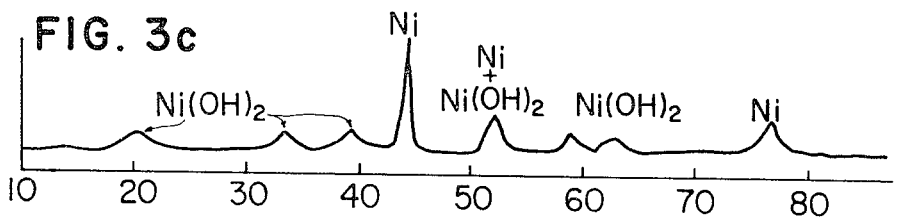

FIG. 3c shows a pattern of dendrite layers equivalent to those in FIG. 3b but dipped in pure water for 24 hours. In this process, the growth of crystallized $Ni(OH)_2$ was found. This change occurs from the surface of the layers being in contact with water and can be seen by the naked eye as the surface color changes to white green.

Figure 3D:
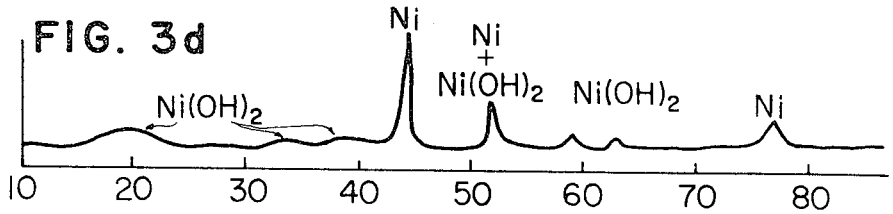

FIG. 3d shows a pattern of deposit layers equivalent to those in FIG. 3b but dipped in aqueous solution of 40% of KOH for 30 minutes. In this process, the crystallized $Ni(OH)_2$ is determined but the surface color is not changed to green.

Figure 3E:
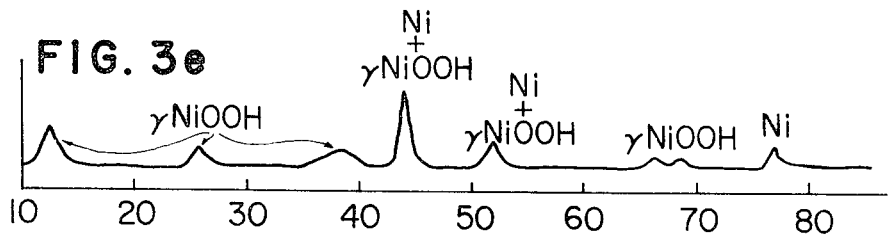

FIG. 3e shows a pattern of deposit layers equivalent to those in FIG. 3b but electrolytically oxidized in electrolyte of KOH. In this process, metallic nickel is decreased and γ-type nickel oxyhydroxide (NiOOH) is clearly produced.

Figure 3F:
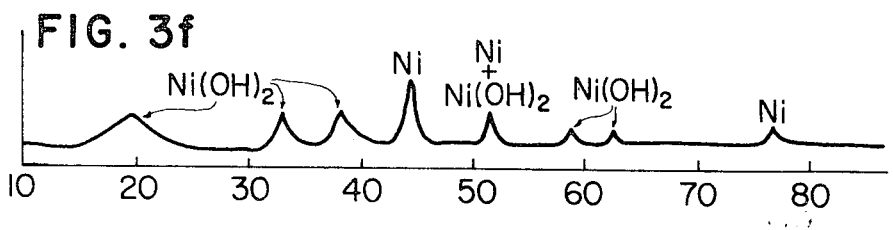

FIG. 3f shows a pattern of deposited layers which is discharged (electrolytically reduced) from those in FIG. 3e. The color of the layers is black, but, as metallic nickel is accurately determined in the X-ray deflection pattern, the change of NiOOH in FIG. 3e to $Ni(OH)_2$ is inferable.

As above mentioned, the positive electrode produced by electrolytically oxidizing the dendrite layers, which layers have been electro-deposited to the perforated foil-shaped substratum in the electro-bath, is adapted to make a cell by laying a particularly produced separator between the positive electrode and the negative electrode. Morover, a cylindrical type cell is made by the steps of piling a positive electrode, separator, negative electrode, and separator, curling them like a volute ring, inserting them into a cylindrical casing, adding an alkaline electrolyte, connecting the electrodes to respective cell terminals, and settling. When making flat type cells, or square type cells for commercial storage batteries, they are assembled by a similar method by utilizing a usual sintered plate. On this occasion, the negative electrode is mainly composed of cadmium, zinc, iron or the like and proper shaped negative electrodes such as pressed type electrodes, sintered type electrodes, or electro-depositing type electrodes can be utilized.

The dendrite layers according to the present invention can be adapted not only to alkaline accumulators but also to fuel cells, alkaline primary cells and batteries, and electrolytic capacitors or catalyst systems.

When the active dendrite layers electrolytically cohered to the substratum and oxidized are adapted to the positive electrode for the rechargeable alkaline cells, there is provided an especially thin positive electrode capable of extremely quick discharge and charge, whereby the cell according to the present invention is excellent in its recharge durability, while being produced speedily and cheaply.

We claim:

1. A process for producing an electrode for alkaline cells comprising the steps of preparing an electro-bath of mixed nickel salts containing as its main constituents $Ni(NO_3)_2 \cdot 6H_2O$ in the range of about 2.5% to about 15%, $NiSO_4 \cdot 6H_2O$ in the range of about 25% to about 90%, and $NiCl_2 \cdot 6H_2O$ in the range of about 5% to about 70%, said constituents being compounded to prepare the electro-bath at the total concentration of about 15% to about 55%, keeping said electro-bath weakly acidic, keeping the temperature of said electro-bath over 40° C., electrolytically cohering nickel dendrite layers and depositing nickel hydroxide simultaneously on a substratum, dipping said layers in a concentrated solution containing nickel nitrate as a main constituent, depositing $Ni(OH)_2$ into pores of said dendrite layers by electro-reduction in said solution, and electrolytically oxidizing said layers in an alkaline electrolyte.

2. A process for producing an electrode for alkaline cells comprising the steps of preparing a nickel electro-bath of weak acid containing $NO_3$ ion in the range of about 0.16% to about 3.52%, $SO_4$ ion in the range of about 1.4% to about 18.1%, and Cl ion in the range of about 2.2% to about 11.5%, keeping the temperature of said electro-bath over 40° C., electrolytically depositing nickel dendrite layers to cohere on a substratum, and immediately electrolytically oxidizing said layers in alkaline aqueous solution.

3. A process for producing an electrode for alkaline cells as claimed in claim 2, wherein said substratum is in its original form selected from the group consisting of a tape shaped thin long metal plate, a perforated thin metal plate or foil, and a metal net of small meshes.

4. A process for producing an electrode for alkaline cells as claimed in claim 3, wherein the material of said substratum is selected from the group consisting of nickel, nickel plated iron, and titanium.

5. A process for producing an electrode for alkaline cells as claimed in claim 2, wherein said substratum is previously annealed and the surface thereof is cleaned by an acid solution.

6. A process for producing an electrode for alkaline cells as claimed in claim 2, wherein said electro-bath contains $NH_3$ dissolved therein.

7. A process for producing an electrode for alkaline cells as claimed in claim 2, wherein a boric acid of small quantity is added to said electro-bath containing as its main constituents $Ni(NO_3)_2$, $NiSO_4$ and $NiCl_2$.

8. A process for producing an electrode for alkaline cells as claimed in claim 2, wherein said electro-bath also includes soluble salts in a small quantity.

9. A process for producing an electrode for alkaline cells as claimed in claim 2, wherein a mixed solution containing $HNO_3$, $H_2SO_4$ and HCl is added to said solution for pH control.

10. A process for producing an electrode for alkaline cells as claimed in claim 2, wherein an insulative frame is brought close and set next to the prearranged cutting off portions and connecting portions of said substratum.

11. A process for producing an electrode for alkaline cells as claimed in claim 2, wherein an anode bag and continuous filter apparatus are adapted to remove floating matter in said electro-bath.

12. A process for producing an electrode for alkaline cells as claimed in claim 2, wherein said electro-bath contains Mn dissolved therein.

13. A process for producing an electrode for alkaline cells as claimed in claim 2, wherein said electro-bath contains Cd dissolved therein.

14. A process for producing an electrode for alkaline cells comprising the steps of preparing an electro-bath of mixed nickel salts containing as its main constituents $Ni(NO_3)_2 \cdot 6H_2O$ in the range of about 2.5% to about 15%, $NiSO_4 \cdot 6H_2O$ in the range of about 25% to about 90%, and $NiCl_2 \cdot 6H_2O$ in the range of about 5% to about 70%, said constituents being compounded to prepare the electro-bath at the total concentration of about 15% to about 55%, keeping said electro-bath to weak acid, keeping the temperature of said electro-bath over 40° C., electrolytically cohering nickel dendrite layers and depositing nickel hydroxide simultaneously on a substratum, dipping said layers in a concentrated solution containing nickel nitrate as a main constituent, depositing $Ni(OH)_2$ into pores of said dendrite layers by electro-reduction in an alkaline aqueous solution, and electrolytically oxidizing said layers in another alkaline electrolyte.

References Cited

UNITED STATES PATENTS

| | | | |
|---|---|---|---|
| 3,214,355 | 10/1965 | Kandler | 204—56 |
| 1,402,751 | 1/1922 | Edison | 136—28 |
| 3,455,741 | 7/1969 | Schneider | 136—76 |
| 3,466,231 | 9/1969 | MacArthur | 204—56 |
| 3,282,808 | 11/1966 | Kandler | 136—29 X |
| 3,335,033 | 8/1967 | Kober | 136—29 |
| 3,347,706 | 10/1967 | Krivanek et al. | 136—28 |
| 3,441,440 | 4/1969 | Silverstone | 136—29 |

ANTHONY SKAPARS, Primary Examiner

U.S. Cl. X.R.

136—75

UNITED STATES PATENT OFFICE
CERTIFICATE OF CORRECTION

Patent No. 3,674,561  Dated July 4, 1972

Inventor(s) Takashi Tsuchida et al.

It is certified that error appears in the above-identified patent and that said Letters Patent are hereby corrected as shown below:

Column 5, line 9 - after "solution" place a period (.) and add -- The plating solution --.

Signed and sealed this 6th day of March 1973.

(SEAL)
Attest:

EDWARD M. FLETCHER, JR.
Attesting Officer

ROBERT GOTTSCHALK
Commissioner of Patents